(12) United States Patent
Liang et al.

(10) Patent No.: US 12,141,392 B2
(45) Date of Patent: Nov. 12, 2024

(54) DISPLAY PANEL, DISPLAY DEVICE AND DRIVING METHOD

(71) Applicant: NOVATEK MICROELECTRONICS CORP., HsinChu (TW)

(72) Inventors: Keko-Chun Liang, Hsinchu (TW); Jhih-Siou Cheng, New Taipei (TW); Hsu-Chih Wei, Hsinchu (TW); Jui-Chan Chang, Hsinchu (TW); Ju-Lin Huang, Zhubei (TW); Po-Ying Chen, Tainan (TW); Wen-Yi Hsieh, Tainan (TW)

(73) Assignee: Novatek Microelectronics Corp., Hsinchu (TW)

( * ) Notice: Subject to any disclaimer, the term of this patent is extended or adjusted under 35 U.S.C. 154(b) by 390 days.

(21) Appl. No.: 17/531,848

(22) Filed: Nov. 22, 2021

(65) Prior Publication Data
US 2022/0083191 A1 Mar. 17, 2022

Related U.S. Application Data

(63) Continuation-in-part of application No. 16/286,686, filed on Feb. 27, 2019, now Pat. No. 11,182,018.
(Continued)

(51) Int. Cl.
*G06F 3/041* (2006.01)
*G09G 3/36* (2006.01)

(52) U.S. Cl.
CPC ........ *G06F 3/04166* (2019.05); *G06F 3/0412* (2013.01); *G09G 3/36* (2013.01); *G09G 2320/0223* (2013.01)

(58) Field of Classification Search
CPC ..... G06F 3/04166; G06F 3/0412; G09G 3/36; G09G 2320/0223; G09G 2330/021
See application file for complete search history.

(56) References Cited

U.S. PATENT DOCUMENTS 8,723,896 B2 5/2014 Huang
9,305,504 B2 4/2016 Yu et al.
(Continued)

FOREIGN PATENT DOCUMENTS

CN 105573543 A 5/2016
CN 107092396 A 8/2017
(Continued)

OTHER PUBLICATIONS

Huang et al., Machine Translation of Foreign Patent Document CN 107204164, A Drive method for embedded touch control display device, and moving device employing drive method, Sep. 26, 2017, pp. 1-36 (Year: 2017).*
(Continued)

*Primary Examiner* — Amr A Awad
*Assistant Examiner* — Maheen I Javed
(74) *Attorney, Agent, or Firm* — JCIPRNET

(57) ABSTRACT

The present invention discloses a display panel and a display device. The display panel comprises a plurality of common electrode blocks and a plurality of display regions. During a display period, one or more common electrode blocks corresponding to one of the display regions which is to be displayed during the display period are coupled to a common voltage; and during the display period, one or more of the common electrode blocks corresponding to the display regions which are not to be displayed during the display period are kept in a floating state.

6 Claims, 12 Drawing Sheets

Related U.S. Application Data

(60) Provisional application No. 62/636,872, filed on Mar. 1, 2018.

(56) References Cited

U.S. PATENT DOCUMENTS

| | | | |
|---|---|---|---|
| 9,727,163 | B2 | 8/2017 | Mizuhashi et al. |
| 10,402,012 | B2 | 9/2019 | Yang et al. |
| 10,529,270 | B2 | 1/2020 | Lin et al. |
| 2003/0006955 | A1 | 1/2003 | Tsuchi |
| 2005/0057470 | A1 | 3/2005 | Tobita |
| 2005/0163669 | A1 | 7/2005 | Taylor et al. |
| 2005/0168491 | A1 | 8/2005 | Takahara et al. |
| 2006/0077738 | A1 | 4/2006 | Kwon |
| 2006/0227628 | A1 | 10/2006 | Eriguchi et al. |
| 2006/0227638 | A1 | 10/2006 | Kudo et al. |
| 2008/0100605 | A1 | 5/2008 | Shirai et al. |
| 2009/0160787 | A1 | 6/2009 | Westerman et al. |
| 2010/0156868 | A1 | 6/2010 | Hirayama |
| 2014/0211363 | A1 | 7/2014 | Oebser |
| 2015/0378486 | A1* | 12/2015 | Yu .................. G06F 3/04164 427/79 |
| 2016/0320886 | A1 | 11/2016 | Kim et al. |
| 2017/0115789 | A1 | 4/2017 | Conway et al. |
| 2017/0269781 | A1 | 9/2017 | Yang et al. |
| 2018/0192538 | A1 | 7/2018 | Sakalkar et al. |
| 2019/0294291 | A1* | 9/2019 | Jia .................. G06F 3/0416 |

FOREIGN PATENT DOCUMENTS

| | | | | |
|---|---|---|---|---|
| CN | 107204164 A | * | 9/2017 | ........... G06F 3/0412 |
| EP | 3182257 A1 | | 6/2017 | |
| TW | 104136095 | | 5/2017 | |
| TW | 201717185 A | | 5/2017 | |
| TW | 201735000 A | | 10/2017 | |

OTHER PUBLICATIONS

CN Office Action dated Jan. 6, 2022 in Chinese application (No. 201910152721.7).

TW Office Action dated Dec. 12, 2019 in Taiwan application (No. 108106909).

* cited by examiner

DISPLAY PANEL, DISPLAY DEVICE AND DRIVING METHOD

This is a continuation-in-part application of U.S. application Ser. No. 16/286,686, filed Feb. 27, 2019, which claims the benefit of U.S. provisional Application No. 62/636,872, filed Mar. 1, 2018, the subject matters of which are incorporated herein by reference.

BACKGROUND OF THE INVENTION

Field of the Invention

The invention relates to a display panel and a display device.

Description of the Related Art

In modern life, there exists several input mechanisms for performing operation on electronic devices. Touch display devices such as touch screens are increasingly being popular in portable electronic devices due to their ease of operation and versatility. With touch display devices, users can perform selection or move objects on a screen by simply moving a finger or a stylus on a touch screen. With the growing maturity of touch with display driver integration (TDDI) technology, how to design a driving method suitable for a touch display device is one of the current topics in the industry.

In conventional liquid crystal displays (LCD) without touch sensing function, bottom plates of all the pixel capacitors (e.g., liquid crystal capacity) are common electrodes and are coupled to a common voltage VCOM provided by a driver IC, and top plates of the pixel capacitors are pixel electrodes and are provided by a pixel voltage from the driver IC. In a touch display panel with a TDDI driver, the bottom plate of the pixel capacitors can be divided into a number of blocks, i.e., a number of common electrodes, according to touch detecting resolution such that the common electrodes serve as touch detecting electrodes when the touch display panel performs touch detecting function. FIG. 1 shows a block diagram of a conventional touch display device having a TDDI driver, wherein a block labeled by TDDI in FIG. 1 is a TDDI driver. As shown in FIG. 1, bottom plates of the pixel capacitors of the touch display panel 10 are divided into a number of blocks 12 (i.e., common electrodes 12). A multiplexing circuit in the TDDI driver (not shown) can selectively couple the common electrode the common voltage VCOM in a display mode and couple the common electrode to a touch detecting circuit of the TDDI driver in a touch detecting mode.

FIG. 2 shows a schematic diagram of operations that the common electrodes of a conventional touch display panel switch between displaying and touch detecting. In the example of FIG. 2, the bottom plates of the pixels of the touch display panel 20 is divided into 4×4 blocks as 16 common electrodes, and an active display area is divided into 4 display regions r #1-r #4, each of the display regions includes tens or hundreds of horizontal display lines, and the common electrodes of each display region can be regarded as a row of common electrodes. Each frame period includes a display period and a touch detecting period. The display period is called a DP-TERM, and the touch detecting period is called a TP-TERM. During each display period, pixel data may be displayed on a corresponding display region. During each touch detecting period, the TDDI driver performs touch detection by one or more columns of common electrodes (used as touch detection electrodes) of the touch display panel. As the approach shown in FIG. 2, the TDDI driver repeats the switching between DP-TERM and TP-TERM to complete a full screen display and touch detection of the entire panel. The common electrodes connected to the common voltage VCOM during the display period are depicted by dotted blocks, and the common electrodes which serve as touch detection electrodes are depicted by slashed blocks.

In a conventional practice, the sixteen common electrodes corresponding to all the four display regions r #1-r #4 are connected to the common voltage VCOM during each display period, even though pixel data of only one display region are refreshed and pixel data of other display regions are not refreshed yet.

The waveform shown in the lower half of FIG. 2 is a schematic diagram of the voltage at the output of the TDDI driver connected to the common electrodes. The upper waveform represents the voltage connected to the first common electrode row (i.e., the common electrodes corresponding to the first display region r #1) during the display period and the touch detecting period. The lower waveform represents the voltage connected to the second common electrode row (i.e., the common electrode row corresponding to the second display region r #2) during the display period and the touch detecting period.

In a conventional LCD without touch sensing function, the major power consumption of a display driver IC is spent on charging and discharging data lines based data voltages outputted to drive respective pixels. The loading of the data lines are parasitic capacitors formed between the data lines and other nodes in the pixel circuitry of a display panel, wherein the largest part of loading may be parasitic capacitors between the data lines and the common electrodes.

SUMMARY OF THE INVENTION

An aspect of the present invention discloses a display panel. The display panel comprises a plurality of common electrode blocks and a plurality of display regions. During a display period, one or more common electrode blocks corresponding to one or more of the display regions which are to be displayed during the display period are coupled to a common voltage; and during the display period, one or more of the common electrode blocks corresponding to one or more of the display regions which are not to be displayed during the display period are kept in a floating state.

Another aspect of the present invention discloses a display device. The display device comprises a switch circuit and a display panel. The display panel comprises a plurality of common electrode blocks and a plurality of display regions. During a display period, one or more common electrode blocks corresponding to one or more of the display regions which are to be displayed during the display period are coupled to a common voltage by the switch circuit; and during the display period, one or more of the common electrode blocks corresponding to one or more of the display regions which are not to be displayed during the display period are kept in a floating state by the switch circuit.

Another aspect of the present invention discloses a driving method used in a display device. The display device comprises a switch circuit and a display panel, and the display panel comprises a plurality of common electrode blocks and a plurality of display regions. The driving method comprises: during a display period, by the switch circuit, coupling one or more common electrode blocks corresponding to one or more of the display regions which are to be displayed during the display period to a common voltage; and during the display period, by the switch circuit, disconnecting one or more of the common electrode blocks corresponding to one or more of the display regions which are not to be displayed during the display period to the common voltage, such that the one or more of the common electrode blocks corresponding to the display regions which are not to be displayed during the display period are kept in a floating state.

The above and other aspects of the invention will become better understood with regard to the following detailed description of the preferred but non-limiting embodiment(s). The following description is made with reference to the accompanying drawings.

DETAILED DESCRIPTION OF THE INVENTION

Figure 1:
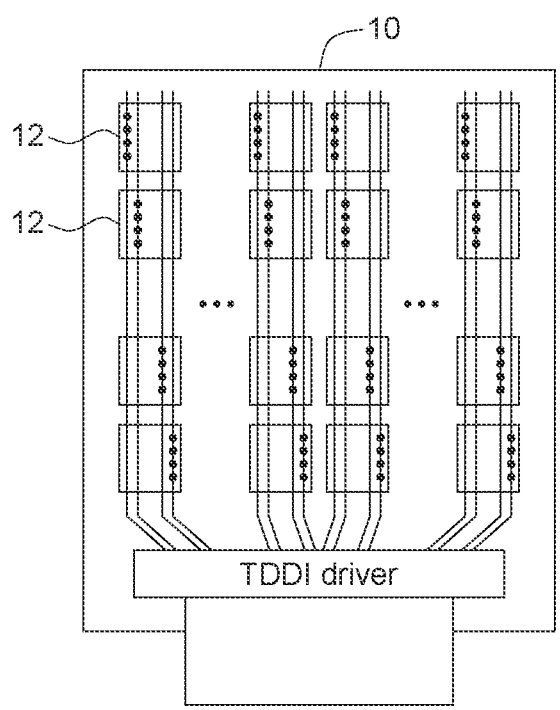
FIG. 1 (prior art) shows a schematic diagram of a conventional display device having a TDDI driver.
Figure 2:
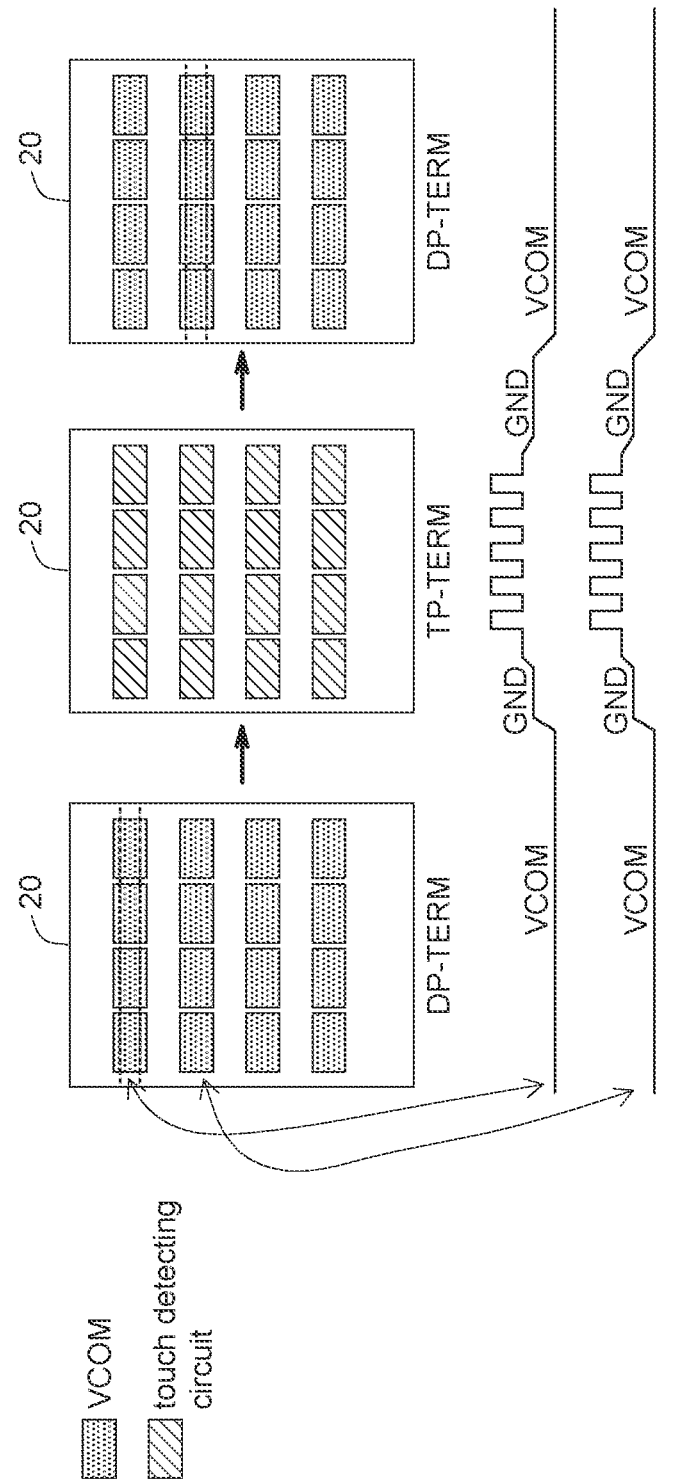
FIG. 2 (prior art) shows a schematic diagram of operations that a conventional touch display device switches between displaying and touch detecting.

The touch display device and the driving method shown in FIGS. 1 to 2 have following disadvantages.

(1) The common voltage VCOM outputted by the TDDI driver is supplied to each common electrode via the multiplexing circuit and the traces in the touch display panel, and the resistance of the path from a common voltage generation circuit in the TDDI driver to the common electrode is larger than the resistance of the path from a common voltage generation circuit in a conventional display driver (without touch detecting function) to the common electrode of a conventional display panel. When displaying, pixel voltages may be coupled to the common electrodes via the pixel capacitors, so that the common electrodes need to take a certain time for recovering to the ideal common voltage VCOM. The speed that the common electrodes recover to the ideal common voltage VCOM is hereinafter referred to as "recovery speed". When the resistance of the path of the common voltage VCOM is large, the recovery speed becomes slow, which may lead to abnormality during displaying.

(2) If the difference between the resistances of the said paths with respect to adjacent common electrodes is too large, the recovery time of the common voltage VCOM of the adjacent common electrodes may be different, and a discontinuous display quality may be viewed on the screen. For example, a common electrode that is farther away from the TDDI driver (such as the common electrode block near the top of the touch display panel in FIG. 1) has a slower recovery speed because of a long path distance and a larger resistance. A common electrode that is closer to the TDDI driver (such as the common electrode block near the bottom of the touch display panel in FIG. 1) has a faster recovery speed because of a short path distance and a smaller resistance.

Figure 3A:
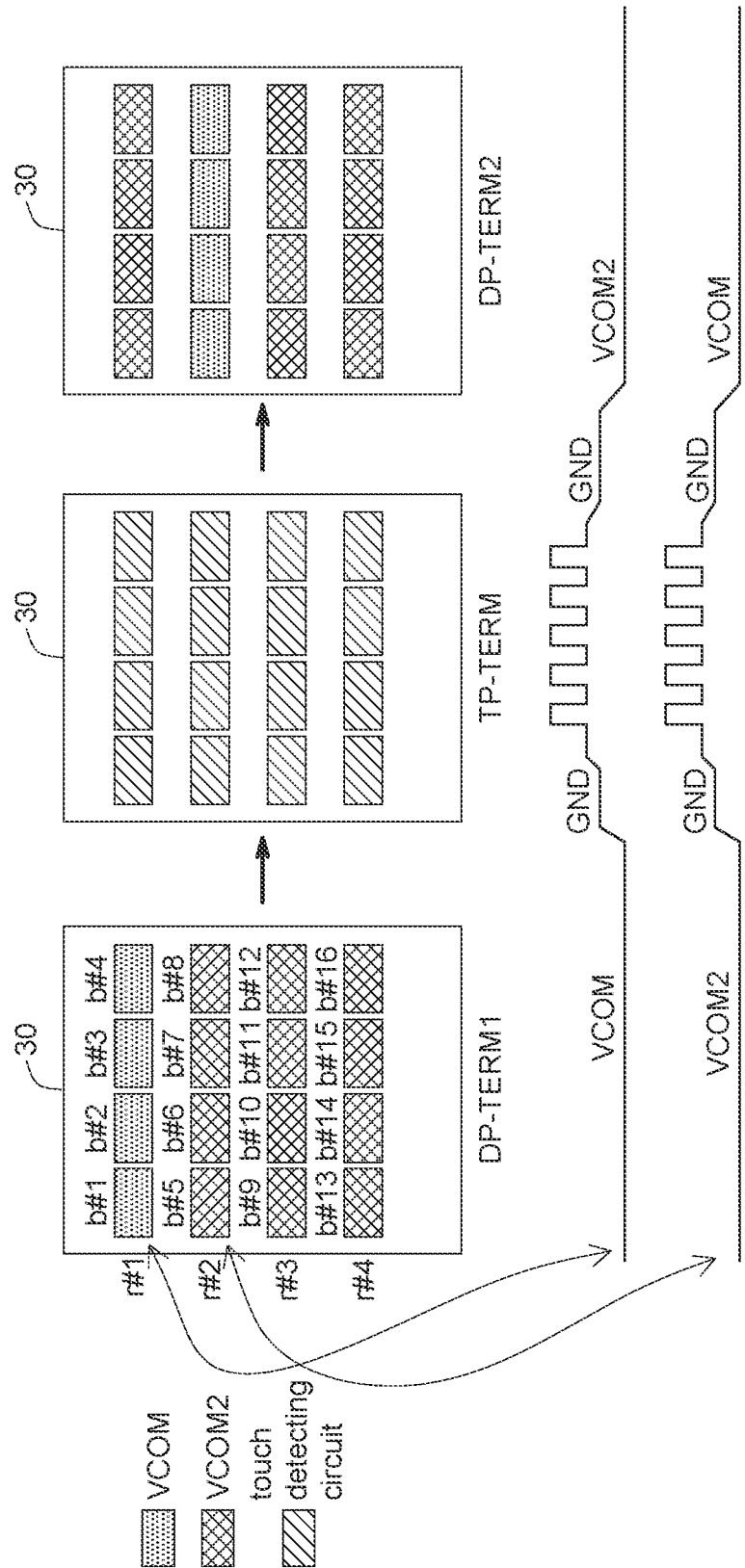
FIG. 3A shows a schematic diagram of operations that a touch display device according to an embodiment of the present invention switches between displaying and touch detecting.
Figure 3B:
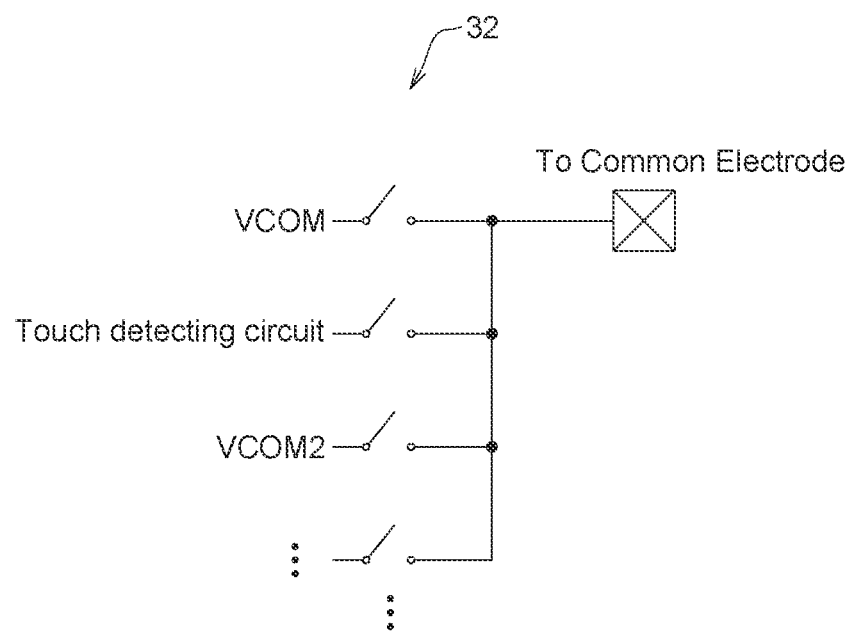
FIG. 3B shows a schematic diagram of a multiplexer (MUX) circuit according to an embodiment of the present invention used in the structure of FIG. 3A.

Referring to FIG. 3A, FIG. 3A shows a schematic diagram of operations that a touch display device according to an embodiment of the present invention switches between displaying and touch detecting. The touch display device (not shown) includes a touch display panel 30 and a touch with display driver integration (TDDI) driver (not shown). The TDDI driver includes a multiplexing circuit (MUX) 32, which has a schematic diagram as shown in FIG. 3B. The touch display panel 30 includes a number of common electrodes. The touch display panel is a touch display driving device and includes a number of display regions. In this embodiment, the common electrodes are 4×4 (i.e., 16) common electrode blocks b #1-b #16, and an active display area of touch display device is divided into four display regions (i.e., the touch display panel includes four display regions r #1-r #4). FIG. 3B shows a schematic diagram of a multiplexing circuit according to an embodiment of the present invention used in the structure of FIG. 3A. As shown in FIG. 3B, the multiplexing circuit 32 is configured to selectively couple a first common voltage VCOM, a touch detecting circuit and a second common voltage VCOM2 to the common electrode blocks b #1-b #16. The second common voltage VCOM2 is different from the first common voltage VCOM and may be a ground voltage. In an embodiment, the multiplexing circuit 32 may be controlled by a controller of the touch display device. In another embodiment, the multiplexing circuit 32 is further configured to selectively couple a high impedance terminal to the common electrode blocks corresponding to the display region not to be displayed during the display period.

During a first display period (DP-TERM1), the touch display panel 30 displays pixel data of a first display region r #1. The first display region r #1 includes a number of horizontal display lines, and pixel data of the horizontal display lines are refreshed line by line. The multiplexing circuit 32 couples the common electrode blocks b #1-b #4 corresponding to the first display region r #1 to the first common voltage VCOM provided by the TDDI driver. The other common electrode blocks b #5-b #16 corresponding to the other display region r #2-r #4 are coupled to the second common voltage VCOM2 by the multiplexing circuit 32. The second common voltage VCOM2 may be a voltage such as ground or Hi-Z. In FIG. 3A, the common electrode blocks b #1-b #4 coupled to the first common voltage VCOM are represented by dotted blocks, and the common electrode blocks b #5-b #16 coupled to the second common voltage VCOM2 are represented by mesh blocks.

In an embodiment, the TDDI driver includes one or more operational amplifier (OP), which are in a common voltage generation circuit, and the first common voltage VCOM is provided by the one or more OP. When the pixel voltages are coupled to the common electrodes via the pixel capacitors, the process of pulling the common electrodes from the pixel voltages to the first common voltage VCOM by the OP(s) requires power consumption. With the approach described above and shown in FIG. 3A (i.e., during a display period, the multiplexing circuit 32 only couples the common electrodes corresponding to a display region which is currently displayed to the first common voltage VCOM), the loading (i.e., the pixel capacitors) seen by the common voltage generation circuit which provides the first common voltage VCOM (e.g., the TDDI driver or the OP(s) of the TDDI driver) may be decreased. In this embodiment, the loading seen by the TDDI driver is decreased to ¼ because only the common electrodes corresponding to ¼ amount of the total display regions are driven by the first common voltage VCOM, comparing with the loading in FIG. 2. Therefore, the recovery speed may be increased. Furthermore, the power consumption for recovery may be decreased. In this embodiment, the power consumption is decreased to ¼ of original power consumption for recovery.

A touch detecting period (TP-TERM) comes after the first display period. During the touch detecting period, all the common electrode blocks b #1-b #16 are coupled to a touch detecting circuit (not shown) of the TDDI driver by the multiplexing circuit 32, and the common electrodes serve as touch detection electrodes for detecting whether a touch event occurs. In FIG. 3A, the common electrodes blocks b #1-b #16 connected to the touch detecting circuit of the TDDI driver are represented by slashed blocks. Then, during a second display period (DP-TERM2), the touch display panel 30 displays the pixel data of a second display region r #2, and the multiplexing circuit 32 only couples the common electrode blocks b #5-b #8 corresponding to the second display region r #2 to the first common voltage VCOM. The other common electrode blocks b #1-b #4, b #9-b #16 corresponding to the display regions r #1, r #3 and r #4 are coupled to the VCOM2 voltage by the multiplexing circuit 32.

The lower part of FIG. 3A shows waveforms of the output voltage provided by the TDDI driver. The upper waveform shows a waveform of the output voltage provided to the common electrode blocks b #1-b #4 corresponding to the first display region r #1 by the TDDI driver, and the lower waveform shows a waveform of the output voltage provided to the common electrode blocks b #5-b #8 corresponding to the first display region r #2 by the TDDI driver.

Comparing with the example shown in FIG. 2, during each display period, the multiplexing circuit 32 couples the common electrode blocks corresponding to the display region to be displayed during the current display period to the first common voltage VCOM rather than couples all the common electrode blocks to the first common voltage VCOM. With such approach, the loading and the power consumption of the circuit (e.g., the TDDI driver or the OP of the TDDI driver) providing the first common voltage VCOM can be decreased, and the recovery speed can be increased accordingly.

Figure 3C:
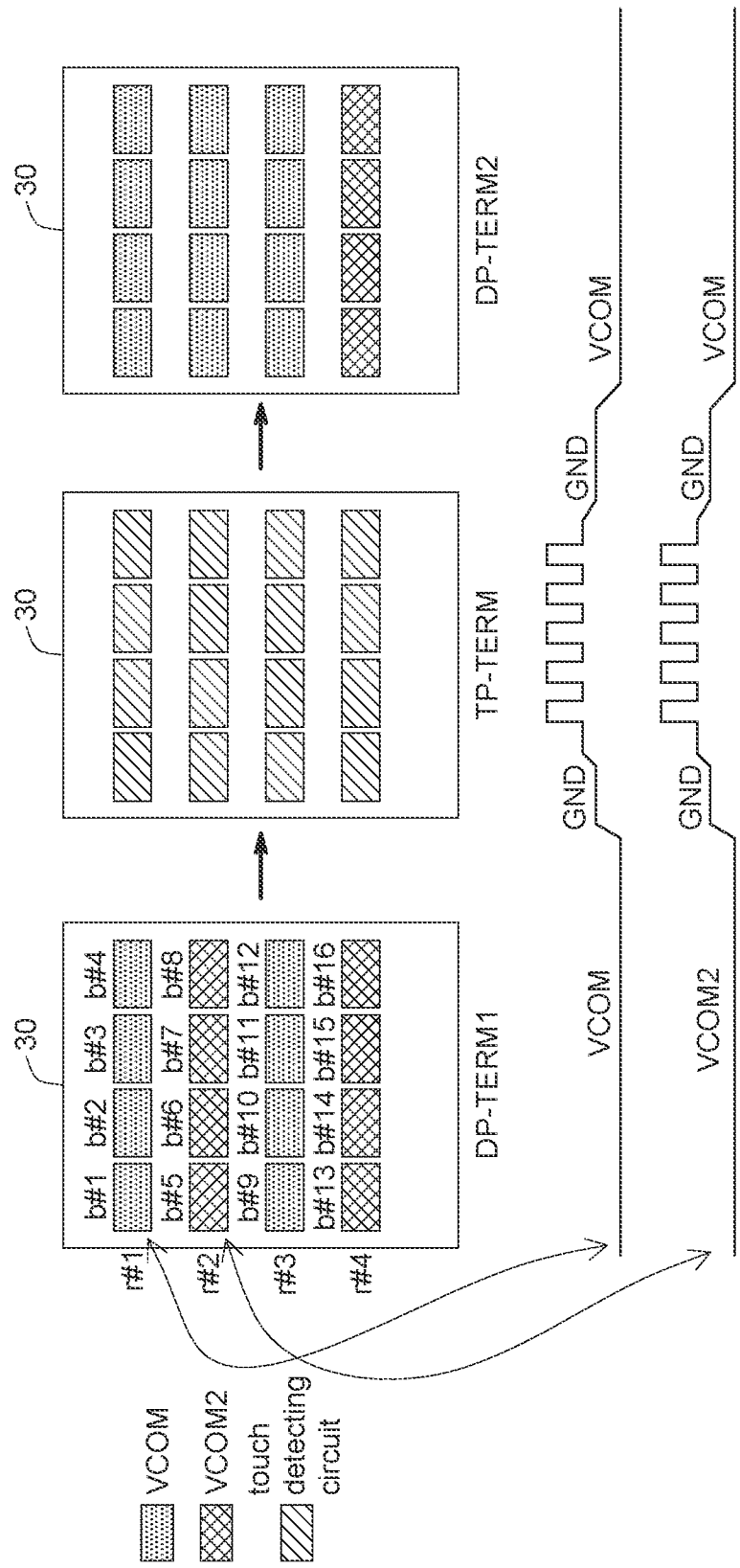
FIG. 3C shows a schematic diagram of operations that a touch display device according to another embodiment of the present invention switches between displaying and touch detecting.

FIG. 3C shows a schematic diagram of operations that a touch display device according to another embodiment of the present invention switches between displaying and touch detecting. In this embodiment, during the display period, the multiplexing circuit not only couples the common electrode blocks corresponding to the display region to be displayed during the current display period to the first common voltage VCOM, but also couples the common electrode blocks corresponding to at least one of the display regions which are not to be displayed during the current display period to the first common voltage VCOM. In the embodiment of FIG. 3C, during a first display period (DP-TERM1), the multiplexing circuit 32 couples the common electrode blocks b #1-b #4 corresponding to the display region r #1 to be displayed during the first display period to the first common voltage VCOM, and the multiplexing circuit 32 also couples the common electrode blocks b #9-b #12 corresponding to the display region r #3 not to be displayed during the first display period to the first common voltage VCOM. The other common electrode blocks b #5-b #8, b #13-b #16 corresponding to the display regions r #2, r #4 are coupled to the second common mode voltage VCOM2 by the multiplexing circuit 32. During a second display period (DP-TERM2), the multiplexing circuit 32 couples the common electrode blocks b #5-b #8 corresponding to the display region r #2 to be displayed during the second display period to the first common voltage VCOM, and the multiplexing circuit 32 also couples the common electrode blocks b #1-b #4, b #9-b #12 corresponding to the display region r1 #1, r #3 not to be displayed during the second display period to the first common voltage VCOM. The other common electrode blocks b #13-b #16 corresponding to the display regions r #4 are coupled to the second common voltage VCOM2 voltage by the multiplexing circuit 32.

That is, the present invention does not limited by the amount of the common electrode blocks which are coupled to the common voltage corresponding to the display region to be displayed, during a display period by the multiplexing circuit 32. However, considering of power consumption and recovery speed, the amount of the common electrode blocks which are coupled to the first common voltage VCOM during a display period is preferably less than the total amount of the common electrode blocks. Additionally, the amount of the common electrode blocks which are coupled to the Common voltage VCOM during each display period can either be the same or different. Furthermore, as shown in FIG. 3C, the common electrode blocks which are coupled to the Common voltage VCOM within the display region not going to be displayed during the current display period can either be adjacent or not adjacent to the display region which is going to be displayed.

Figure 4:
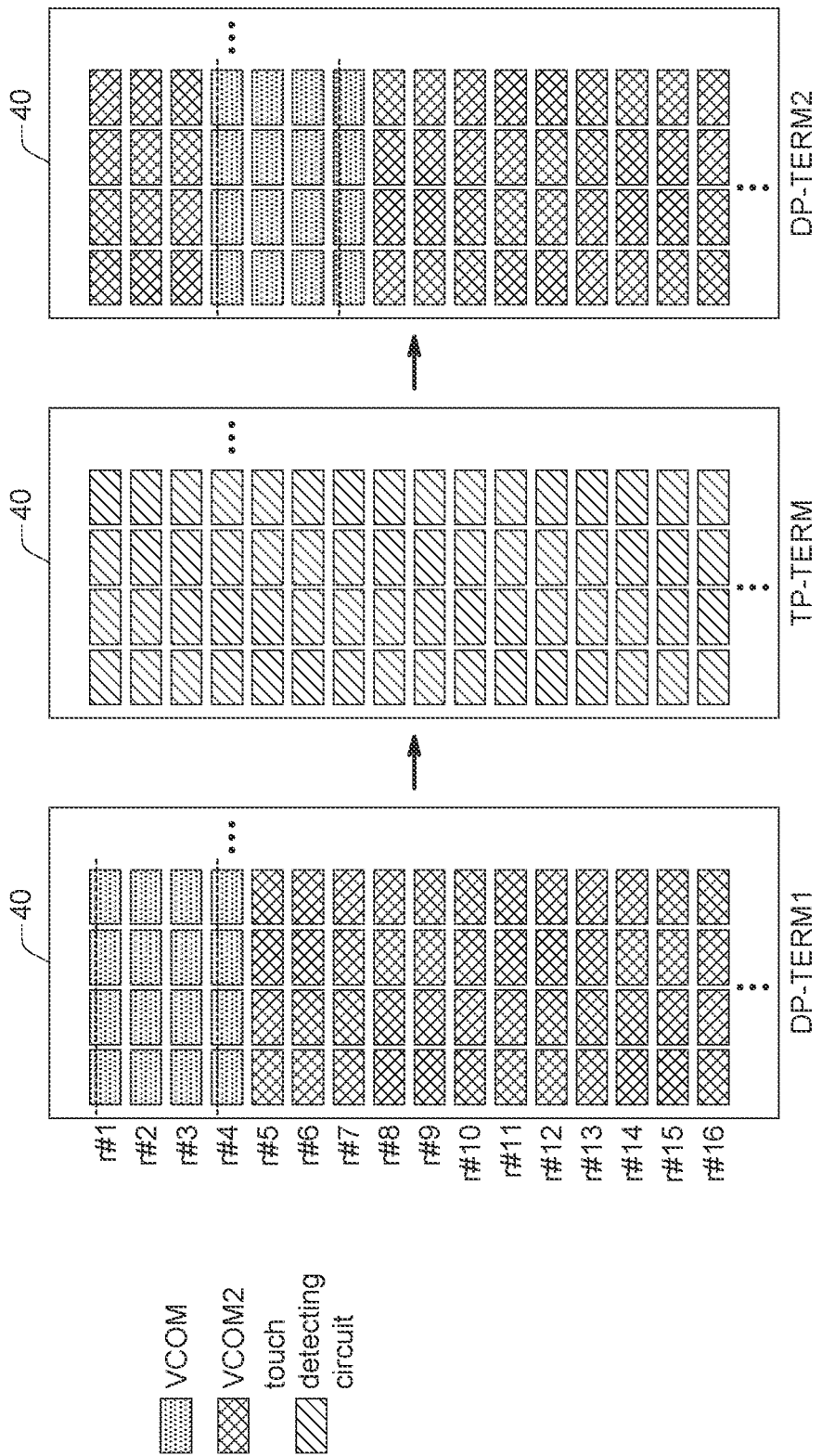
FIGS. 4 and 5 show a schematic diagram of operations that a touch display device according to yet another embodiment of the present invention switches between displaying and touch detecting.
Figure 5:
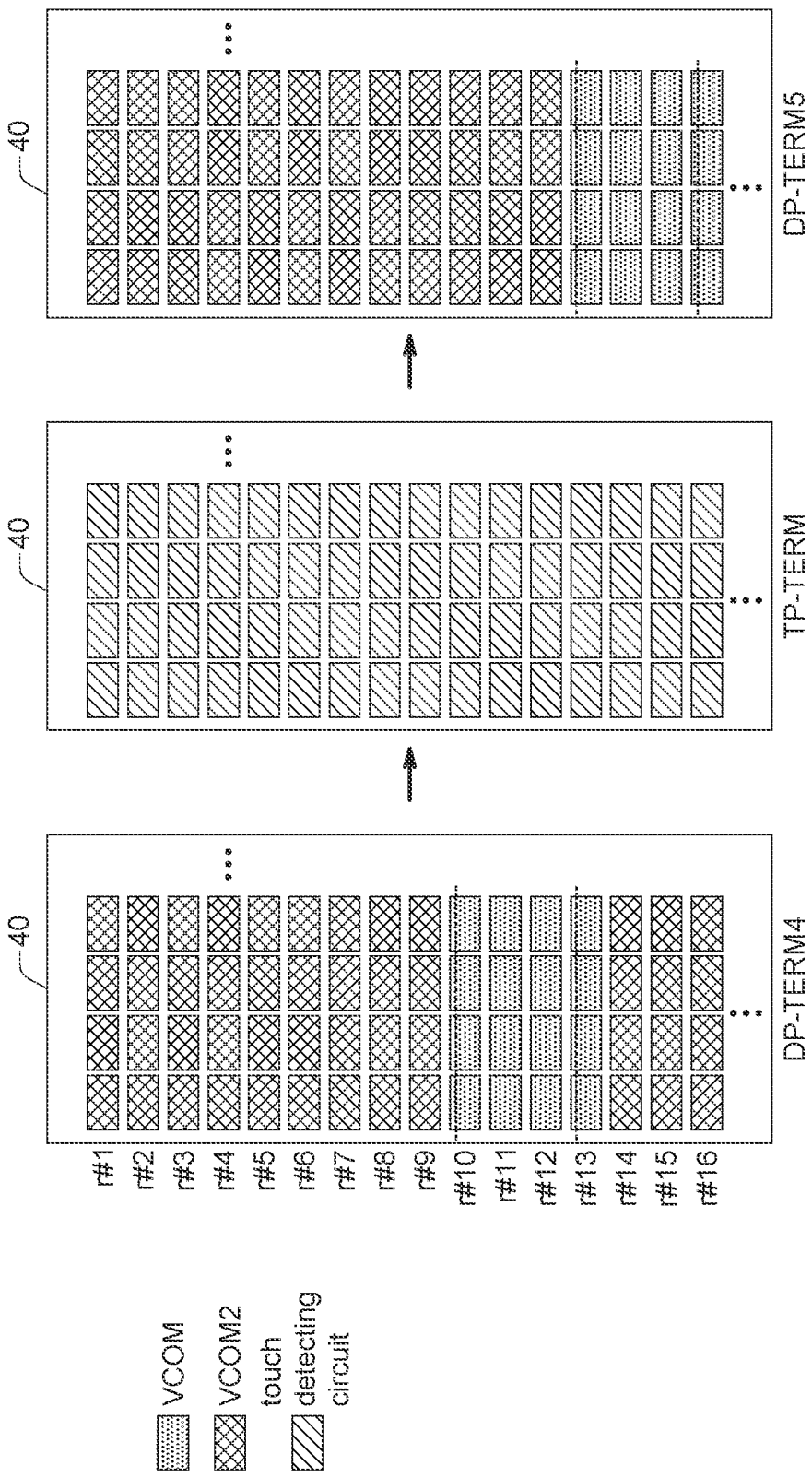

FIGS. 4 and 5 show yet another embodiment. In this embodiment, the touch display panel 40 includes 32 rows of common electrode blocks and 18 columns of common electrode blocks (i.e., 32×18 common electrode blocks). Taking full HD as an example, the resolution of the touch display panel 40 may be 1920×1080. In this example, each row of the common electrode blocks corresponds to 60 display lines (1920/32=60), and each column of the common electrode blocks corresponds to 180 data lines (1080*3/18). In this example, the touch display panel 40 includes 10 display regions, which means that each of the display regions includes 192 display lines. During a display period, 3.2 rows of the common electrode blocks are corresponding to a display region to be displayed. That is, the multiplexing circuit may couple at least four rows of the common electrode blocks to the first common voltage VCOM during a display period.

As shown in FIG. 4, during a first display period (DP-TERM1), the touch display panel 40 displays pixel data of a first display region which includes the first display line to the 192th display line, which corresponds to the first four rows r #1-r #4 of the common electrode blocks. In this embodiment, the multiplexing circuit couples the rows r #1-r #4 of the common electrode blocks corresponding to the display region to be displayed during the current display period to the first common voltage VCOM provided by the TDDI driver (represented by dotted blocks). In this embodiment, the multiplexing circuit couples the other common electrode blocks to the second common voltage VCOM2 (represented by mesh blocks), and in this embodiment the second common voltage VCOM2 is ground voltage. Since the multiplexing circuit couples 4 rows of common electrode blocks rather than all rows of the common electrode blocks to the first common voltage VCOM, the loading seen by the common voltage generation circuit of the TDDI driver which provides the first common voltage VCOM may be decreased to 4/32 (i.e., 1/8) of the original loading, and the recovery speed is increased accordingly. Furthermore, the power consumption for driving the common electrodes during the display period can also be decreased to 1/8.

During a touch detecting period (TP-TERM), all the common electrode blocks are coupled to the touch detecting circuit of the TDDI driver (represented by slashed blocks) for detecting whether a touch event occurs. During a second display period (DP-TERM2), the display touch panel 40 displays the second display region which includes the 193th display line to the 384th display line. That is, the second display region corresponds to the fourth row to the seventh row r #4-r #7 of the common electrode blocks. The multiplexing circuit couples the rows r #4-r #7 of the common electrode blocks corresponding to the display region to be displayed during the current display period to the first common voltage VCOM provided by the TDDI driver (represented by dotted blocks), and couples the other common electrode blocks to the second common voltage VCOM2 (represented by mesh blocks).

As shown in FIG. 5, after a fifth display period (DP-TERMS), a half screen has been displayed by the touch display panel 40. That is, all the display lines corresponding to the first row to the sixteenth row of the common electrode blocks has been displayed. From a sixth display period, the operation may be similar to the first display period.

It is noted that the way to detect touch events in the touch detecting period (TP-TERM) is not limited in the embodiments of the present invention. Although embodiments in FIGS. 3A-3C and FIGS. 4-5 illustrate that all of the common electrode blocks (used as touch detecting electrodes) are coupled to the touch detecting circuit by the multiplexing circuit during the touch detecting period, other way to control the common electrode blocks during the touch detecting period may corporate with the control scheme regarding to the common electrode blocks during the display periods.

Figure 6:
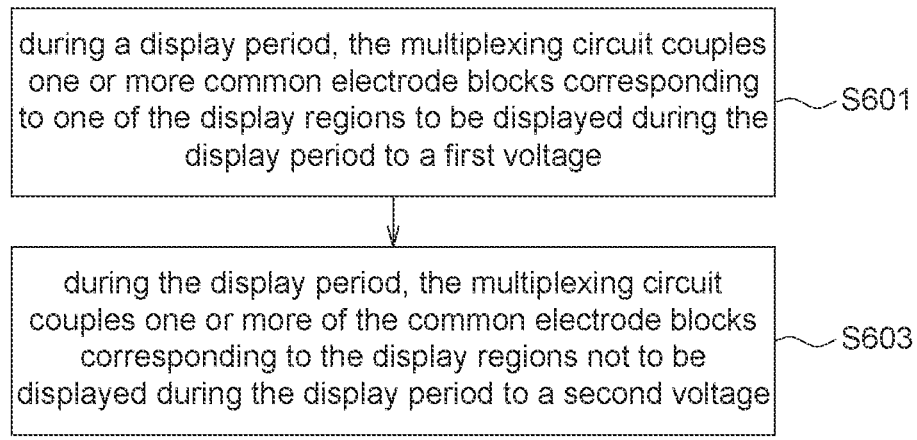
FIG. 6 shows a flowchart of a driving method in a display device according to an embodiment of the present invention.

FIG. 6 shows a flowchart of a driving method in touch display device according to an embodiment of the present invention. The driving method may be used in the touch display device of the above embodiments. The touch display device includes a touch display panel and a TDDI driver which includes a multiplexing circuit (MUX). The touch display panel includes a number of display regions. The touch display panel includes a number of common electrode blocks.

In step S601, during a display period, the multiplexing circuit couples one or more common electrode blocks corresponding to one of the display regions to be displayed during the display period to a first voltage (e.g., first common voltage VCOM).

In step S603, during the display period, the multiplexing circuit couples one or more of the common electrode blocks corresponding to the display regions not to be displayed during the display period to a second voltage (e.g., second common voltage VCOM2).

Figure 7:
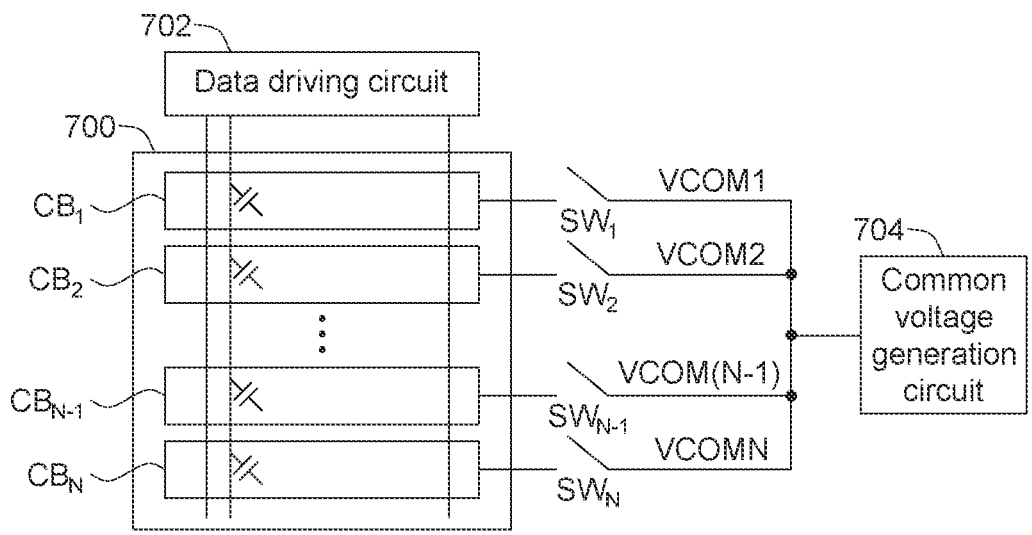
FIG. 7 shows a schematic diagram of a display device 70 according to an embodiment of the present invention.

FIG. 7 shows a schematic diagram of a display device 70 according to an embodiment of the present invention. The display device 70 includes a display panel 700 which is without a touch sensing function, a data driving circuit 702 and a common voltage generation circuit 704. The display device 70 may not be able to provide touch sensing function, or may still provide a touch sensing function by using a out-cell touch panel disposed on the display panel 700. The display panel 700 includes pixel rows (not shown in FIG. 7) which are called horizontal display lines or display lines, gate lines (not shown in FIG. 7) by which scan driving signals are sequentially turing on the pixel switches of the pixel rows, data lines by which data voltages of each pixel row are outputted at the same time to the display panel 700, and a common electrode plate. The common electrode plate of the display panel 700 is divided into a plurality of common electrode blocks $CB_1$-$CB_N$. Since the display panel 700 does not have the touch sensing function, the common electrode blocks $CB_1$-$CB_N$ are not used as touch sensing electrodes, and the size and shape of the common electrode blocks $CB_1$-$CB_N$ may be more flexibly arranged. The data driving circuit 702 is coupled to the data lines and configured to output the data voltages corresponding to the pixels of the display panel 700.

The common voltage generation circuit 704 is configured to generate and output a plurality of common voltages $VCOM_1$-$VCOM_N$, and the common electrode blocks $CB_1$-$CB_N$ are respectively coupled to the common voltage generation circuit 704 through a switch circuit including a plurality of switches $SW_1$-$SW_N$, to receive the common voltages $VCOM_1$-$VCOM_N$. The common voltages $VCOM_1$-$VCOM_N$ may be configured to have the same voltage level (denoted by VCOM) or different voltage levels. For each common electrode block among the common electrode blocks $CB_1$-$CB_N$, it is provided with a common voltage when a corresponding switch among the switches $SW_1$-$SW_N$ is turned on, and it is not provided with the common voltage and is kept in a floating state when the corresponding switch is turned off. The switches $SW_1$-$SW_N$ may be implemented in the display panel 700, or in the common voltage generation circuit 704. The display device 70 also includes a control circuit (not shown in FIG. 7) for generating control signals to turn on/off the switches $SW_1$-$SW_N$. The control circuit may be included in a timing control integrated circuit (IC) or may be integrated with the data driving circuit as a display driver IC. The pixel rows which common electrodes belongs to a common electrode block are referred to as a display region. By respectively controlling the on/off state of the switches $SW_1$-$SW_N$, There may be no charging or discharging manner in some of the parasitic capacitors (as capacitor symbols denoted in FIG. 7) between the data line and those floating common electrode blocks, thus the loading of the data lines are reduced.

Figure 8:
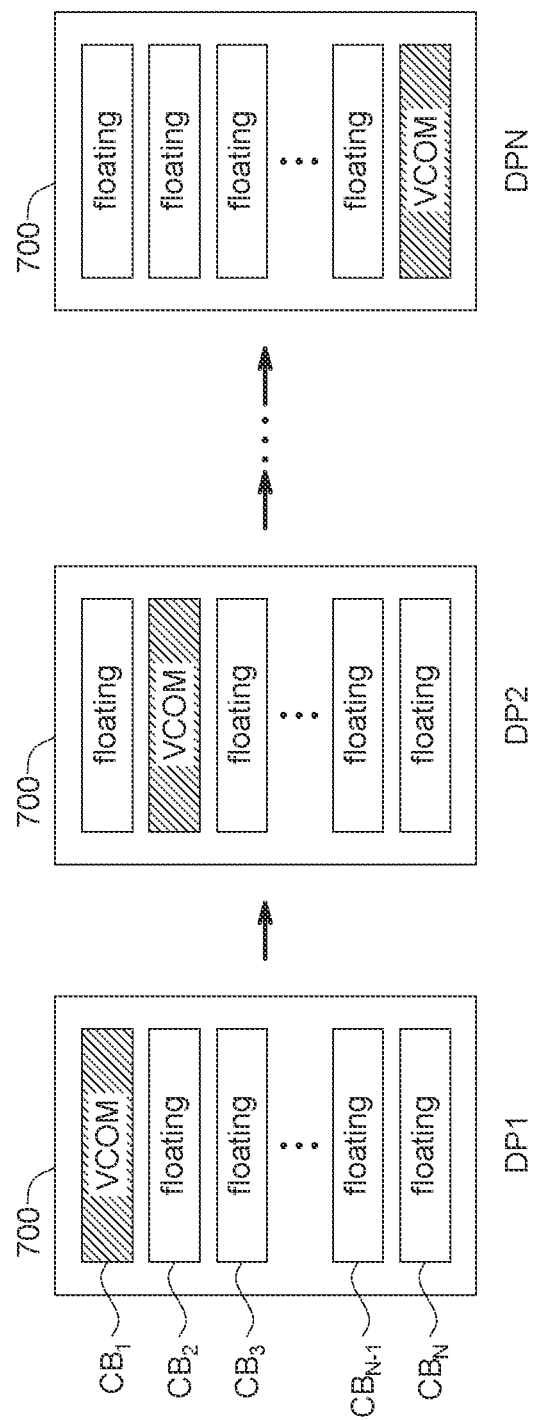
FIG. 8 shows an exemplary control scheme to the common electrode blocks of the display panel of FIG. 7 according to an embodiment of the present invention.

FIG. 8 shows an exemplary control scheme to the common electrode blocks of the display panel 700. In FIG. 8 (and also FIG. 9-10), a frame period can be regarded as a plurality of display periods from the earliest display period DP1 to the last display period DPN, wherein each display period includes a plurality of horizontal line periods. The pixel rows corresponding to the common electrode block CB1 are regarded as a display region displaying in the display period DP1, the pixel rows corresponding to the common electrode block CB2 are regarded as a display region displaying in the display period DP2, and so forth. The control scheme according to FIG. 8 is to provide the common voltage VCOM to only a common electrode block which is corresponding to a currently displaying pixel row (which is regarded as belonging to a display region being displayed in a current display period), while other common electrode blocks which are not corresponding to the currently displaying pixel row (which is regarded as belonging to a display region not being displayed in a current display period) are kept in a floating state. During the display period DP1, the switch SW1 is controlled to be turned on and switches SW2-SWN are controlled to be turned off, such that the common electrode block CB1 is provided with the common voltage VCOM and the common electrode blocks CB2-CBN are in the floating state. In a similar manner, during the display period DP2, the switch SW2 is controlled to be turned on and switches SW1 and SW3-SWN are controlled to be turned off, such that the common electrode block CB2 is provided with the common voltage VCOM and the remaining common electrode blocks CB1 and CB3-CBN are in the floating state. Therefore, the loading of the data lines in anyone horizontal line period is reduced since most of the common electrode blocks are in the floating state. As long as not all of the common electrode blocks are provided with the common voltage VCOM in every horizontal line period, the loading of the data lines can be reduced. In another example, during odd display periods (DP1, DP3 . . . ), odd common electrode blocks are provided with the common voltage VCOM and even common electrode blocks are in the floating state, and during even display periods (DP2, DP4 . . . ), even common electrode blocks are provided with the common voltage VCOM and odd common electrode blocks are kept in the floating state.

Figure 9:
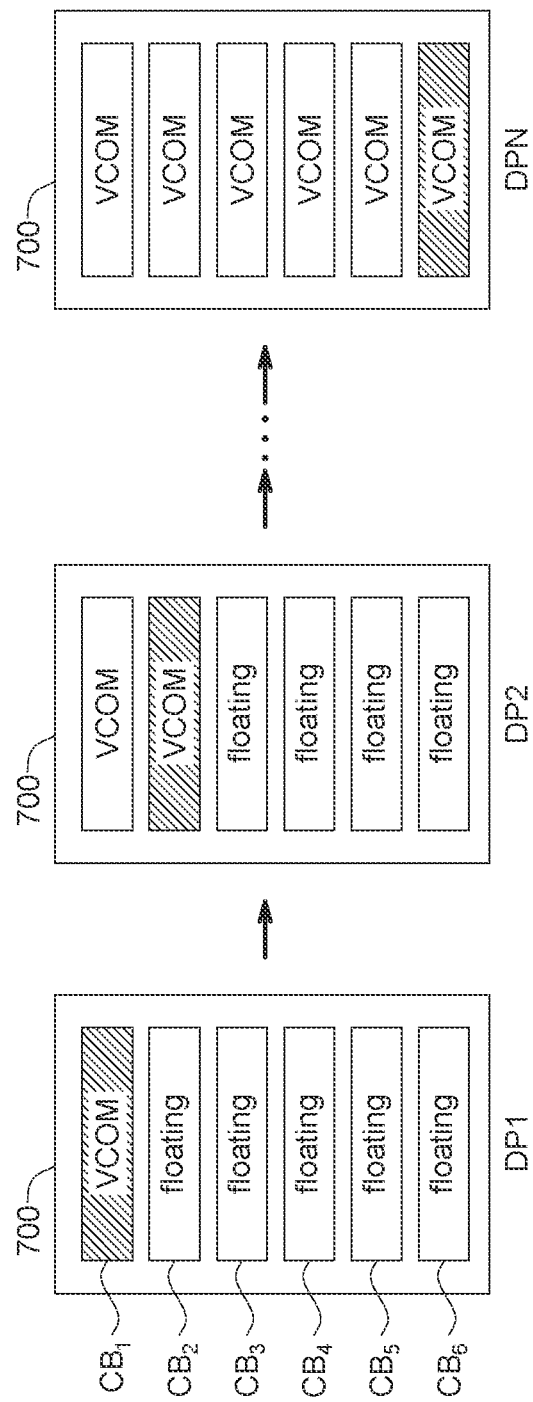
FIG. 9 shows an exemplary control scheme to the common electrode blocks of the display panel of FIG. 7 according to an embodiment of the present invention.

FIG. 9 shows an exemplary control scheme to the common electrode blocks of the display panel 700. In FIG. 9, the common electrode blocks CB1 to CB6 are depicted as an example. The control scheme according to FIG. 9 is to provide the common voltage VCOM to a common electrode block which is corresponding to a currently displaying pixel row during a display period in a frame period and to still provide the common voltage VCOM to the common electrode block(s) corresponding to the pixel rows (i.e. the display region) which have been completed displayed before the display period the in the frame period, while the remaining common electrode blocks are kept in the floating state. For example, during the display period DP2 shown in FIG. 9, the switch SW2 is controlled to be turned on and the switch SW1 are still kept in the turn-on state such that the common electrode blocks CB1 and CB2 are provided with the common voltage VCOM, while during the display period DP2 the switches SW3-SWN are controlled to be turned off such that the remaining common electrode blocks CB3-CBN (corresponding to those display regions not yet displayed) are in the floating state.

Figure 10:
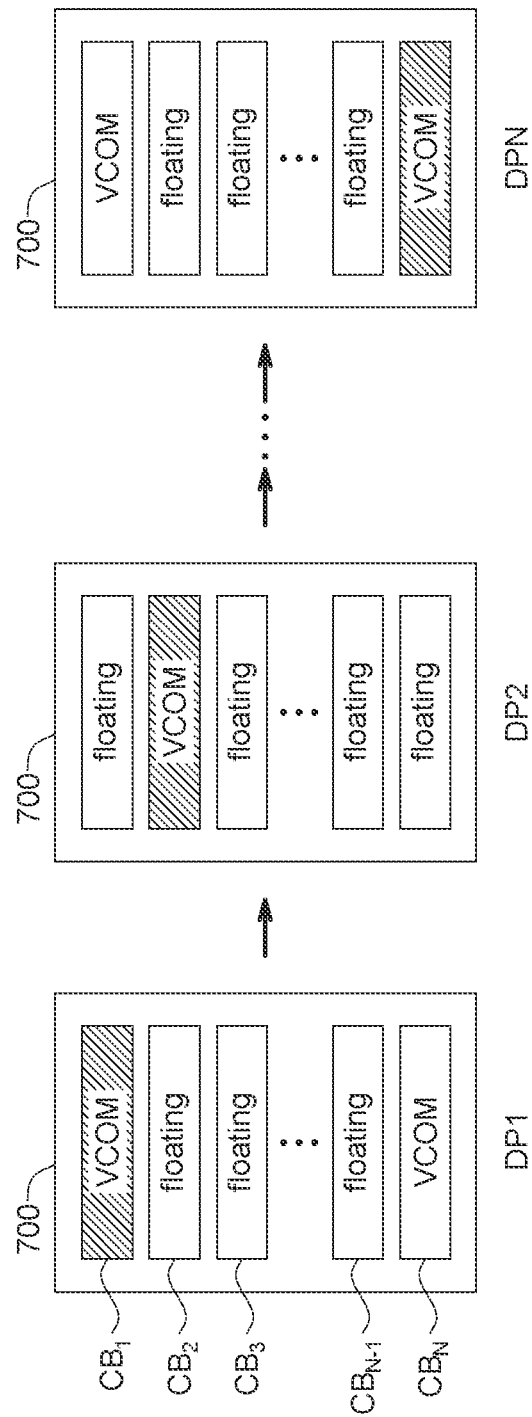
FIG. 10 shows an exemplary control scheme to the common electrode blocks of the display panel of FIG. 7 according to an embodiment of the present invention.
Figure 11:
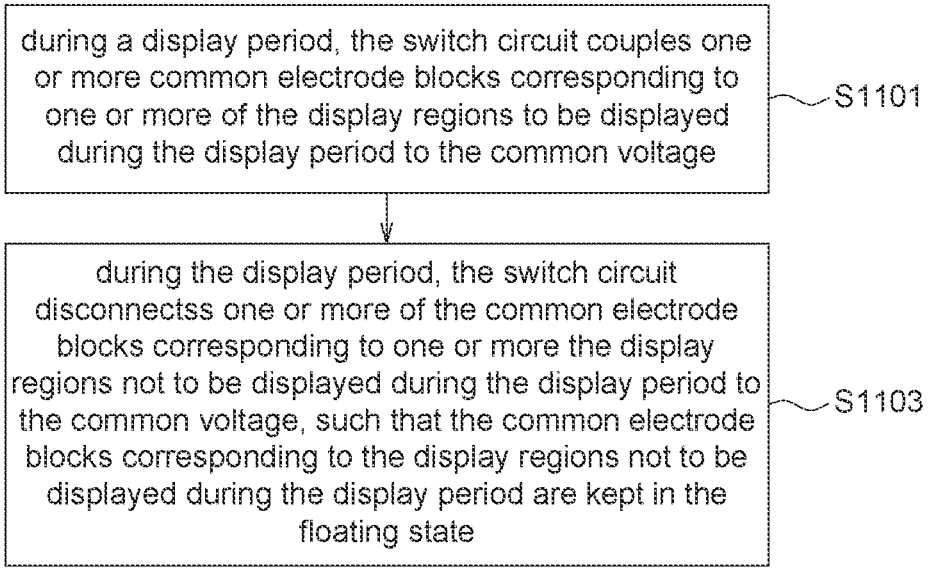
FIG. 11 shows a flowchart of a driving method in a display device according to an embodiment of the present invention.

FIG. 10 shows an exemplary control scheme to the common electrode blocks of the display panel 700. The control scheme according to FIG. 10 brings a benefit that is to eliminate the difference between the data line loading at the near-end (which is the nearest to the data driving circuit) and the data line loading at the far-end (which is farthest from the data driving circuit). The control scheme according to FIG. 10 is, during the first display period DP1 when the pixel rows corresponding to the first common electrode block CB1 are displaying, the common voltage generation circuit 704 does not only provide the common voltage VCOM to the first common electrode block CB1 through the switch SW1 (in the turn-on state) but also provides the common voltage VCOM to the last common electrode block CBN the switch SWN (in the turn-on state), and during the last display period DPN when the pixel rows corresponding to the last common electrode block CBN are displaying, the common voltage generation circuit 704 does not only provide the common voltage VCOM to the last common electrode block CBN through the switch SWN (in the turn-on state) but also provides the common voltage VCOM to the firsy common electrode block CB1 the switch SW1 (in the turn-on state). With respect to pixel rows which are displaying in the display periods except DP1 and DPN, their corresponding common electrode blocks are kept in the floating state. By using the control scheme of FIG. 10, the data line loading at the farthest-end (which is farthest from the data driving circuit) may be approximate to the data line loading at the nearest-end (which is nearest to the data driving circuit), such that the charging and discharging manner at the nearest-end and at the farthest-end may be similar. FIG. 11 shows a flowchart of a driving method in a display device according to an embodiment of the present invention. The driving method may be used in the display device without touch sensing function. The display device such as the display device 70 of FIG. 7, includes a display panel, a data driver (data driving circuit), a common voltage generation circuit, and a switch circuit including a plurality of switches. The display panel includes a plurality of common electrode blocks and a plurality display regions corresponding to the common electrode blocks, and each display region are a plurality of pixel rows. The switch circuit may be implemented in the display panel. By using the driving method of FIG. 11, the control schemes illustrated in FIG. 8-FIG. 10 can be realized. In step S1101, during a display period, the switch circuit couples one or more (but not all) of the common electrode blocks corresponding to one or more of the display regions to be displayed during the display period to the common voltage. In step S1103, during the display period, the switch circuit disconnects one or more of the common electrode blocks corresponding to one or more of the display regions not to be displayed during the display period to the common voltage, such that those common electrode blocks corresponding to the display regions not to be displayed during the display period are kept in the floating state.

Also noted that "a display region to be displayed during a display period" refers to the display region that the pixel data of the display region is refreshed during the display period; and "a display region not to be displayed during a display period" refers to the display region(s) that the pixel data of the display region(s) does/do not be refreshed during the display period.

According to the embodiment described above, by decreasing the amount of the common electrodes coupled to the Common voltage VCOM to the amount that only regards to the display region to be displayed, the loading of the common voltage generation circuit providing the first common voltage VCOM can be reduced, thereby the faster recovery speed can be achieved without affecting the screen display. Since the loading of the circuit providing the first common voltage VCOM is reduced, the power consumption can be reduced accordingly.

While the invention has been described by way of example and in terms of the preferred embodiment (s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A display panel, comprising:
   a plurality of common electrode blocks; and
   a plurality of display regions, wherein during a display period which is neither corresponding to a first display region which is the nearest to a display driver nor corresponding to a second display region which is the farthest from the display driver, one or more common electrode blocks corresponding to one or more of the display regions which are to be displayed during the display period are directly connected to a common voltage; and during the display period, one or more of the common electrode blocks corresponding to one or more of the display regions which are not to be displayed during the display period are kept in a floating state,
   wherein during a display period which is corresponding to the first display region, not only a first common electrode block corresponding to the first display region but also a second common electrode block corresponding to the second display region are directly connected to the common voltage, and the common electrode blocks other than the first common electrode block and the second common electrode block are kept in the floating state,
   wherein during a display period which is corresponding to the second display region, not only the second common electrode block but also the first common electrode block are directly connected to the common voltage, and the common electrode blocks other than the first common electrode block and the second common electrode block are kept in the floating state.

2. The display panel according to claim 1, wherein during the display period which is neither corresponding to the first display region which is the nearest to the display driver nor corresponding to the second display region which is the farthest from the display driver, the one or more common electrode blocks corresponding to one or more of the display regions which have been displayed before the display period starts are directly connected to the common voltage.

3. A display device, comprising:
   a switch circuit; and
   a display panel, comprising:
      a plurality of common electrode blocks; and
      a plurality of display regions, wherein during a display period which is neither corresponding to a first display region which is the nearest to a display driver nor corresponding to a second display region which is the farthest from the display driver, one or more common electrode blocks corresponding to one or more of the display regions which are to be displayed during the display period are directly connected to a common voltage by the switch circuit; and during the display period, one or more of the common electrode blocks corresponding to one or more of the display regions which are not to be displayed during the display period are kept in a floating state by the switch circuit,
      wherein during a display period which is corresponding to the first display region, not only a first common electrode block corresponding to the first display region but also a second common electrode block corresponding to the second display region are directly connected to the common voltage, and the common electrode blocks other than the first common electrode block and the second common electrode block are kept in the floating state,
      wherein during a display period which is corresponding to the second display region, not only the second common electrode block but also the first common electrode block are directly connected to the common voltage, and the common electrode blocks other than the first common electrode block and the second common electrode block are kept in the floating state.

4. The display device according to claim 3, wherein during the display period which is neither corresponding to the first display region which is the nearest to the display driver nor corresponding to the second display region which is the farthest from the display driver, the one or more common electrode blocks corresponding to one or more of the display regions which have been displayed before the display period starts are directly connected to the common voltage by the switch circuit.

5. A driving method used in a display device, the display device comprising a switch circuit and a display panel, the display panel comprising a plurality of common electrode blocks and a plurality of display regions, and the driving method comprising:
   during a display period which is neither corresponding to a first display region which is the nearest to a display driver nor corresponding to a second display region which is the farthest from the display driver, by the switch circuit, directly connecting to one or more common electrode blocks corresponding to one or more of the display regions which are to be displayed during the display period to a common voltage;
   during the display period, by the switch circuit, disconnecting one or more of the common electrode blocks corresponding to one or more of the display regions which are not to be displayed during the display period to the common voltage, such that the one or more of the common electrode blocks corresponding to the display regions not to be displayed during the display period are kept in a floating state;
   during a display period which is corresponding to the first display region, by the switch circuit, directly connecting, not only a first common electrode block corresponding to the first display region but also a second common electrode block corresponding to the second display region to the common voltage, and maintaining the common electrode blocks other than the first common electrode block and the second common electrode block being in the floating state; and
   during a display period which is corresponding to the second display region, by the switch circuit, directly connecting, not only the second common electrode block but also the first common electrode block to the common voltage, and maintaining the common electrode blocks other than the first common electrode block and the second common electrode block being in the floating state.

6. The driving method according to claim 5, further comprising:
 during the display period which is neither corresponding to the first display region which is the nearest to the display driver nor corresponding to the second display region which is the farthest from the display driver, by the switch circuit, maintaining coupling other display regions which have been displayed before the display period starts to the common voltage.

* * * * *